United States Patent [19]

Cheiky

[11] Patent Number: 4,957,826
[45] Date of Patent: Sep. 18, 1990

[54] RECHARGEABLE METAL-AIR BATTERY

[75] Inventor: Michael C. Cheiky, Santa Barbara, Calif.

[73] Assignee: Dreisbach Electromotive, Inc., Santa Barbara, Calif.

[21] Appl. No.: 343,193

[22] Filed: Apr. 25, 1989

[51] Int. Cl.$^5$ ............................................. H01M 12/06
[52] U.S. Cl. ........................................ 429/27; 429/229
[58] Field of Search ............................. 429/28, 27, 231

[56] References Cited

U.S. PATENT DOCUMENTS

| | | | |
|---|---|---|---|
| 3,518,123 | 6/1970 | Katsoulis et al. | 429/28 |
| 3,759,748 | 9/1973 | Palmer | 429/28 |
| 3,960,600 | 6/1976 | Chodosh | 429/28 |
| 4,084,047 | 4/1978 | Himy et al. | 429/229 |
| 4,118,551 | 10/1978 | Chireau et al. | 429/231 |
| 4,585,710 | 4/1986 | McEvoy | 429/27 |

FOREIGN PATENT DOCUMENTS 48-25145  7/1969  Japan ....................... 429/27

Primary Examiner—Donald L. Walton
Attorney, Agent, or Firm—Marvin E. Jacobs

[57] ABSTRACT

A zinc anode plate is completely wrapped in a cloth anode separator containing liquid electrolyte. A hydrogel material packed in an inert mesh separator is sandwiched between the wrapped anode and an air cathode which is in the form of a carbon membrane. The gel material is sufficiently permeable to oxygen to allow oxygen flow therethrough during charging and discharging cycles of the battery, and provides chemical reactive communication between the air cathode and the electrolyte in the anode separator without allowing electrolyte to pass therethrough. The permeability of the gel material is selected such that during charging of the battery, oxygen generated by the anode exerts sufficient pressure at the interface of the anode separator and gel material to cause electrolyte to be recirculated through the edges of the cloth anode separator to the opposite layer thereof, thereby preventing depletion of electrolyte to the anode.

30 Claims, 1 Drawing Sheet

RECHARGEABLE METAL-AIR BATTERY

DESCRIPTION

Technical Field

The present invention generally relates to the conversion of chemical to electrical energy, and more particularly to a rechargeable metal-air battery.

BACKGROUND OF THE INVENTION

Metal-air batteries, such as zinc-air batteries offer the advantage of very high energy densities (up to 300 WHr/Kg) over known conventional batteries such as the lead-acid type employed in automotive vehicles. Zinc-air batteries can be manufactured on a commercial production basis at low cost and with a high degree of safety. However, commercial applications of zinc-air batteries have previously been limited to primary or non-rechargeable types. Experimental rechargeable zinc-air batteries have been built for use in automotive applications. These batteries use a liquid electrolyte and usually include a pump to recirculate the electrolyte. Such systems are impractical for miniature consumer applications ranging from radios to portable computers because of their mechanical complexity and lack of leak resistance.

A zinc-air battery generally includes a porous zinc anode, an air cathode formed of a carbon membrane, and a porous material containing a liquid electrolyte which is sandwiched between the anode and cathode. A reservoir of electrolyte is needed below the anode since, in practice, electrolyte becomes entrapped in the zinc matrix. As the zinc oxide expands, the electrolyte is forced upwardly. A major problem which exists in the development of rechargeable zinc-air batteries is that the oxygen gas which is generated by the anode during the charging cycle forces electrolyte accumulated above the anode upwardly into and through the air cathode. This results in loss of electrolyte due to evaporation, and contamination of electrolyte through reaction with the atmosphere and catalyst in the air cathode.

STATEMENT OF THE INVENTION

The present invention provides a zinc-air battery which is rechargeable, and capable of operation in both charging and discharging cycles without the use of a mechanical electrolyte pump.

The improved zinc-air battery of the invention does not lose electrolyte during a charging cycle. In addition, the battery does not leak avoiding contamination of material components of the battery. These improvements enable the present zinc-air battery to be used in portable electronics and consumer/entertainment applications.

In the battery of the present invention, metal powder or paste such as zinc in a semi-permeable form is packed in an electrically conductive mesh screen to form an anode. The particle size is adjusted to allow electrolyte permeability. If the powder is too fine, it will densely pack and be impermeable. A liquid electrolyte is retained in a porous cloth anode separator which sandwiches the anode and extends in a continuous wrap around its edges. A layer of cathode gel material is sandwiched between the wrapped anode and an air cathode which is provided in the form of a carbon membrane. The gel material may include an inert mesh screen spacer with the gel material packed in the mesh screen. The gel layer provides electrochemically reactive communication between the air cathode and the electrolyte in the anode separator while enabling oxygen to flow through the gel material during charging and discharging of the battery. The permeability of the gel material is selected to allow sufficient oxygen pressure to build up at the interface of the gel material with the anode separator to cause accumulated electrolyte to be forced from the interface through an edge of the anode separator into the opposite layer of the anode separator.

These and many other features and attendant advantages of the invention will become apparent as the invention becomes better understood by references to the following detailed description when considered in conjunction with the accompanying drawings.

DETAILED DESCRIPTION OF THE INVENTION

Figure 1:
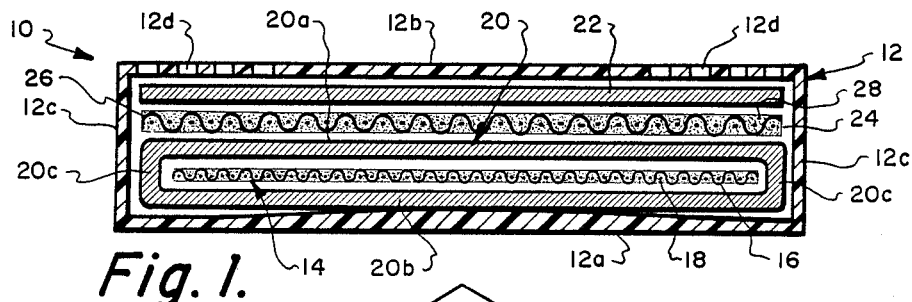
FIG. 1 is a cross-sectional view of a rechargeable zinc-air battery embodying the present invention.
Figure 2:
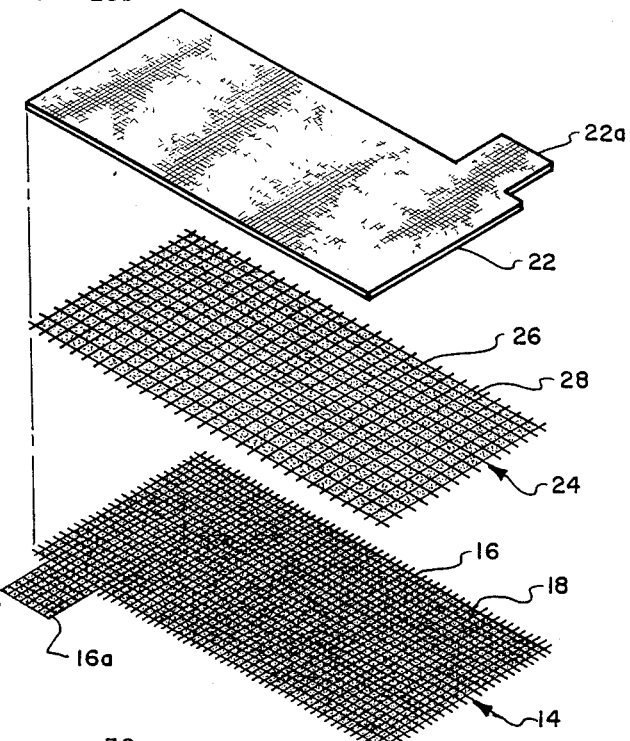
FIG. 2 is an exploded view of an air cathode, a cathode gel screen, and an anode screen of the battery.

Referring now to FIGS. 1 and 2 of the drawing, a rechargeable zinc-air battery embodying the present invention is generally designated by the reference numeral 10 and includes a casing or container 12 made of an inert plastic or other suitable material. A suitable container is disclosed in my co-pending application Ser. No. 244,828, now U.S. Pat. No. 4,894,295 the disclosure of which is expressly incorporated herein by reference. The container 12 has an upwardly convex bottom 12a, a lid or top 12b, and side walls 12c. The top 12b is formed with openings 12d which permit flow of air into and out of the battery during charging and discharging cycles thereof. The purpose of making the bottom 12a convex is to resiliently press the component elements of the battery together for reasons which will become clear from further description. If desired, ribs or similar protrusions may be formed in the top 12b to aid in this function, although not shown in the drawing.

The battery 10 further includes an anode 14 having an electrically conductive plate or mesh screen 16 which is illustrated in FIG. 2. A lead 16a extends outwardly from the mesh screen 16 to provide a positive terminal connection for the battery. The screen 16 maybe formed of expanded metal or foamed metal, with a mesh size of 20 to 80 openings per inch. The material of the screen 16 may be iron, tin, titanium, or other non-corrosive metal or plating of these metals on an economical substrate.

A porous layer of zinc material 18 is packed into the mesh of the screen 16. The zinc material 18 may be zinc powder flakes, granules, capsules, or fibers packed to a semi-permeable density. Various corrosion inhibitors and paste forming additives may be added to the zinc material 18 to improve the performance of the battery if desired. Metals such as mercury, cadmium, tin, lead, gallium or indium provide corrosion inhibition. The metals may be alloyed with the zinc or physically mixed with the zinc particles. Either the zinc, zinc alloys and/or the corrosion inhibiting metal can be coated or plated onto an inert substrate such as metal, sand, glass ceramic, etc. The inhibitor metal is usually present in an amount from 0.1 to 10% by weight.

The anode 14 is completely wrapped in a porous anode separator 20 formed of an absorbent, wettable, oxidation-resistant woven or non-woven cloth such as cotton, rayon, modified CMC and/or wettable plastic fibers. The anode separator 20 may also include inert spacer and/or filler material. Suitable wettable materials can be the same modified polymer materials used as cation exchange materials or hollow fiber material such as carboxyl modified polymers or polysulfone polymers. The modified polymers can be mixed with other polymers such as polypropylene to enhance the structural, capillary or wicking action of the composite. A carboxyl methyl cellulose polymer containing 15% polypropylene can be effectively used as the anode wrapping material in the battery of the invention. As viewed in FIG. 1, the anode separator 20 has a first or upper layer 20a, a second or lower layer 20b, and side or edge layers 20c which interconnect the upper and lower layers 20a and 20b.

A liquid electrolyte required for operation of the battery is contained in the anode separator 20. The electrolyte may be a simple or mixed aqueous base such as a Group I metal hydroxide such as LiOH, NaOH, KOH, CsOH, etc. in the range of one molar to saturation, usually about 1 to 15 m.

The battery 10 also includes an air cathode 22 in the form of an air permeable woven or non-woven carbon membrane or similar material with a high affinity for oxygen. A layer of catalyst such as a noble metal, suitably platinum or palladium can be applied to either surface, preferably the lower surface of the carbon membrane. The air cathode 22 has a lead 22a extending outwardly therefrom to provide a negative terminal for the battery.

In accordance with an important feature of the present invention, a cathode gel member 24 includes a chemically inert mesh screen 26 which serves as a spacing and retaining member. An oxidation and corrosion resistant hydro-gel material 28 such as CMC or related derivatives dissolved or dispersed in a concentrated base such as LiOH, NaOH, KOH, or CsOH is packed into the mesh of the screen 26. The anode 14, cathode gel member 24 and air cathode 22 are sandwiched together inside the container 12 under resilient pressure from the convex bottom 12a thereof as described above. The air cathode contains pores of the order of 50 Angstroms. The hydrogel is needed to prevent liquid from freely passing through the air membrane. However, since the hydrogel contains 80-90% water, the air cathode essentially sees an ionic, liquid electrolyte.

During discharge of the battery 10, the zinc material 18 in the anode 14 is converted to zinc oxide which has a lower density, and thereby a larger volume than zinc. The expanding zinc material 18 applies mechanical pressure to the surrounding porous anode separator 20 causing liquid electrolyte to be released therefrom in order to sustain chemical reaction with the anode 14 and air cathode 22 and generation of electrical current through the leads 16a and 22a. The mechanical pressure applied by the convex bottom 12a of the container 12 prevents separation of the enclosed elements of the battery and the formation of air pockets below the air cathode 22. The cathode gel member 24 provides chemical reactive communication between the electrolyte in the anode separator 20 and the air cathode 22, and is further sufficiently permeable to oxygen to allow oxygen to flow therethrough as required by the charging and discharging cycles of the battery.

During charging of the battery 10, the zinc material 18, which was converted to zinc oxide during discharge, generates oxygen gas which rises through the anode separator 20 and attempts to push electrolyte accumulated at the interface of the upper layer 20a and the cathode gel member 24 upwardly through the air cathode 22 and out of the battery 10. Although permeable to oxygen, the gel material 28 prevents diffusion of electrolyte therethrough into the air cathode 22. The permeability of the gel member 24 to oxygen is selected such that during charging of the battery 10, sufficient oxygen pressure is created at the interface of the upper layer 20a of the anode separator 20 and the cathode gel member 24 to force liquid electrolyte to flow downwardly through the edges 20c of the anode separator 20 into the lower layer 20b thereof as illustrated by arrows in FIG. 1. This recirculation ensures that sufficient electrolyte will be present in the lower layer 20b for use in the next discharge cycle of the battery.

Figure 3:
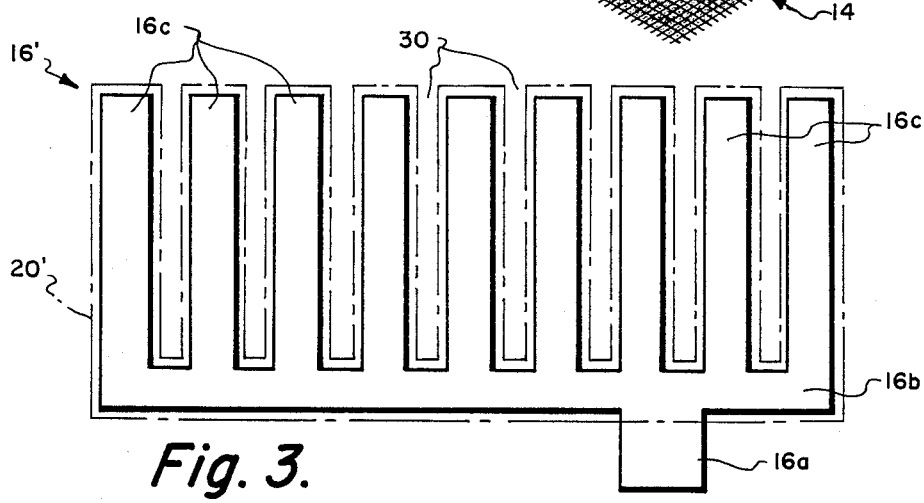
FIG. 3 is a plan view of an alternative arrangement of an anode and an anode separator in accordance with the invention.

The automatic recirculation of electrolyte provided by the present invention without the necessity of a separate mechanical pump has been determined to be dependent on the relative dimensions of the anode components. The recirculation is reduced to an unacceptable extent if the anode is made too wide, or more specifically if the ratio of the surface area of the anode to the area of the edges available for electrolyte recirculation is made too large. In practice, it has been determined that an optimal anode width for batteries in the 10 WHr to 500 WHr capacity range is between 1 and 2 inches. This limitation may be overcome by providing the anode screen in a modified configuration designated as 16' in FIG. 3. The screen 16' includes a base 16b with a plurality of arms 16c extending perpendicularly therefrom. The width of each arm 16c is approximately 2 inches. The anode separator is modified as designated at 20' to be wrapped around the base 16b and the individual arms 16c, while maintaining spaces 30 between adjacent wrapped arms. In effect, each of the wrapped arms 16c constitutes a separate anode having the optimal surface/edge area ratio, with the arms 16c being electrically connected in parallel to increase the combined current flow through the base 16b and lead 16a.

The gel material 28 minimizes diffusion of the catalyst in the air cathode 22 into the electrolyte, thereby increasing the life of the air cathode. In addition, the gel material has a very low solubility for zincate ions, thus minimizing the formation of dendrites which could short out the battery. However, it was unexpected to discover that the basic electrolyte does not dissolve the gel material.

While an illustrative embodiment of the invention has been shown and described, numerous variations and alternate embodiments will occur to those skilled in the art, without departing from the spirit and scope of the invention. Accordingly, it is intended that within the scope of the appended claims, the present invention may be practiced otherwise than as specifically described. It is to be realized that only preferred embodiments of the invention have been described and that numerous substitutions, modifications and alterations are permissible without departing from the spirit and scope of the invention as defined in the following claims.

I claim:

1. A rechargeable metal-air battery, comprising:
   metal anode means;

porous anode separator means for retaining liquid electrolyte having first and second layers which sandwich the anode means therebetween and at least one edge which interconnects the first and second layers and said separator means extends in a continuous wrap around the anode means;

air cathode means; and a liquid electrolyte completely entrained in the porous anode separator means.

2. A battery as in claim 1 further including cathode gel means sandwiched between the air cathode means and the first layer of the anode separator means.

3. A battery as in claim 2 in which the metal comprises zinc.

4. A battery as in claim 3, further comprising a container having a top wall, a bottom wall and side walls and said container enclosing and resiliently pressing the anode means, anode separator means, air cathode means, cathode gel means, and electrolyte means together.

5. A battery as in claim 4, in which the anode means comprises an electrically conductive mesh screen substrate and a zinc material packed in the mesh of the screen.

6. A battery as in claim 5, in which the zinc material is selected from the group consisting of zinc powder flakes, granules, capsules and fibers packed onto a semipermeable density.

7. A battery as in claim 4 in which the bottom wall of the container is in contact with the second layer of the separator means.

8. A battery as in claim 3, in which the cathode gel means is sufficiently permeable to oxygen to enable passage of oxygen therethrough for operative charging and discharging of the battery, the cathode gel means further providing chemical reactive communication between the air cathode and the liquid electrolyte in the anode separator means.

9. A battery as in claim 8, in which the permeability of the cathode gel means is selected such that sufficient oxygen pressure is created during charging of the battery at an interface of the cathode gel means and anode separator means to force liquid electrolyte from the interface through the edge of the anode separator means into the second layer of the anode separator means.

10. A battery as in claim 3, in which cathode gel means comprises an oxidation and corrosion resistant hydro-gel.

11. A battery as in claim 10, in which the hydro-gel comprises a material selected from the group consisting of CMC and related derivatives.

12. A battery as in claim 10, in which the hydro-gel includes a concentrated base selected from the group consisting of LiOH, NaOH, KOH and CsOH.

13. A battery as in claim 10, in which the cathode gel means further includes a chemically inert mesh screen, the hydro-gel being present in the mesh of the screen.

14. A battery as in claim 1, in which the anode separator means comprises an absorbent, wettable oxidation-resistant cloth.

15. A battery as in claim 1, in which the air cathode means comprises a porous carbon membrane.

16. A battery as in claim 1, in which the liquid electrolyte comprises a material selected from the group consisting of an aqueous base containing at least one of LiOH, NaOH, KOH and CsOH in the range of one molar to saturation.

17. An anode for a metal-air battery comprising in combination:

a metal anode element comprising a substrate containing a gas permeable layer of metal anode material; and a continuous wrap of porous eletrolyte separator material having first and second layers and edges connecting said layers surrounding said element, said separator material being wettable by liquid electrolyte, absorbent and oxidation-resistant under conditions of operation of a metal-air battery.

18. An anode according to claim 17 in which the separator material comprises a cellulose material containing polypropylene fibers.

19. An anode according to claim 18 in which the substrate is a metal screen and the layer comprises a gas-permeable layer of metal particles.

20. An anode according to claim 19 in which the anode metal comprises zinc.

21. An anode according to claim 20 in which the anode metal contains 1 to 10% by weight of a corrosion inhibitor.

22. An anode according to claim 19 in which the anode metal is coated onto the substrate screen.

23. An anode according to claim 17 in which the anode element has a base section connected to a plurality of separate, spaced members and each of said members is wrapped with said separator material.

24. A rechargeable metal-air battery comprising:

metal anode means;

porous separator means having a first layer and a second layer and a set of edges connecting said layers and forming a continuous wrap surrounding said metal anode means, said first layer being adjacent to the anode means;

air cathode means;

cathode gel means sandwiched between the air cathode means and the anode means;

a liquid electrolyte entrained in the anode separator means; and a container absent a liquid electrolyte reservoir having a top wall, side walls and a bottom wall which encloses and resiliently presses the anode means, separator means, air cathode means, cathode gel means, and liquid electrolyte together, said bottom wall being in contact with said second layer.

25. A battery as in claim 24, in which the anode means comprises an electrically conductive mesh screen and a zinc material packed in the mesh of the screen.

26. A battery as in claim 24, in which the cathode gel means is sufficiently permeable to oxygen to enable passage of oxygen therethrough for operative charging and discharging of the battery, the cathode gel means further providing chemical reactive communication between the air cathode and the liquid electrolyte in the anode separator means.

27. A battery as in claim 24, in which the anode separator means comprises an absorbent, oxidation-resistant cloth which encases the anode means and serves to wick electrolytes from one surface of the anode means to another surface thereof.

28. A rechargeable metal-air battery, comprising:

metal anode means;

porous anode separator means having first and second layers which sandwich the anode means therebetween and at least one edge which interconnects the first and second layers;

said anode means and anode separator means each comprise a plurality of respective separate sections which are interconnected together;

air cathode means; and a liquid electrolyte entrained in the anode separator means.

29. A battery as in claim 28, in which the sections are between 1 and 2 inches wide.

30. A rechargeable metal-air battery, comprising:

metal anode means comprising an electrically conductive mesh screen substrate and a zinc material packed in the mesh in a semi permeable density, said zinc material being selected from the group consisting of zinc powder flakes, granules, capsules and fiber;

porous anode separator means having first and second layers which sandwich the anode means therebetween and at least one edge which interconnects the first and second layers;

air cathode means; and a liquid electrolyte entrained in the porous anode separator means.

* * * * *

UNITED STATES PATENT AND TRADEMARK OFFICE
CERTIFICATE OF CORRECTION

PATENT NO. : 4,957,826

DATED : September 18, 1990

INVENTOR(S) : Michael C. Cheiky

It is certified that error appears in the above-identified patent and that said Letters Patent is hereby corrected as shown below:

Col. 2, line 24, move "Detailed Description of the Invention" to the next line.

Col. 2, line 49, change "maybe" to --may be--.

Col. 7, line 1, after "and" insert --said--.

Signed and Sealed this

Fourth Day of February, 1992

Attest:

HARRY F. MANBECK, JR.

*Attesting Officer*   *Commissioner of Patents and Trademarks*